July 28, 1925.
W. A. HEARN
FIXTURE FOR WINDOW GUARDS
Filed Feb. 24, 1925
1,547,810
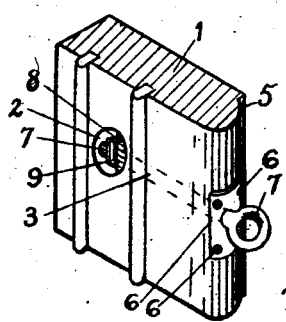
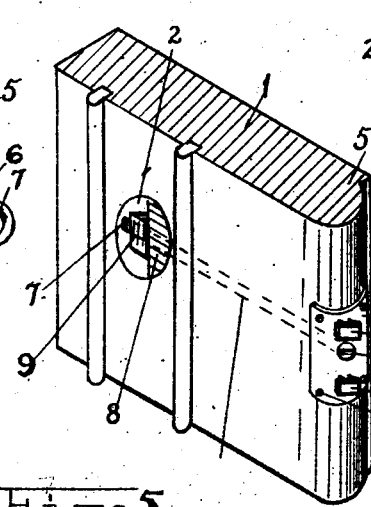
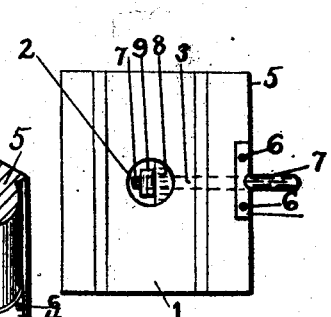
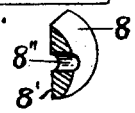
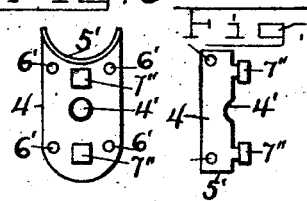
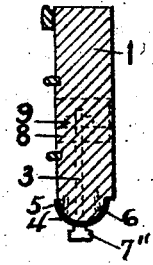
INVENTOR.
Walter A. Hearn
BY Albert Rosenberg
ATTORNEY.

Patented July 28, 1925.

1,547,810

UNITED STATES PATENT OFFICE.

WALTER A. HEARN, OF BALTIMORE, MARYLAND.

FIXTURE FOR WINDOW GUARDS.

Application filed February 24, 1925. Serial No. 11,296.

*To all whom it may concern:*

Be it known that I, WALTER A. HEARN, a citizen of the United States of America, whose post-office address is 3615 Forest Park Avenue, where I am a resident, of the city of Baltimore, in the State of Maryland, have invented a new and useful Improvement in Fixtures for Window Guards, of which the following is a specification.

My invention relates to window guard fixtures, the objects of which are to provide detachable hold-fast bolts to the jambs of window frames to which the safety belts of window cleaners, painters, carpenters, or builders, may be secured; secondly, to provide washer plates under the heads of the hold-fast bolts through which the hold-fast bolts pass and shaped to match the shape of the edges of the window jambs so as to re-inforce the jambs at the places where the hold-fast bolts enter the edges of the jambs; thirdly, to provide a recess in the face of the jambs at right angles to the diameter of the hole bored into the edges of the jambs in which the hold-fast bolt is secured into the jambs, the said recess being made for the reception of the nut and washer placed on the ends of the hold-fast bolts to secure them in position in the jambs; fourthly, to provide washers shaped with one face squared with the hole in them and the other face curved to match the circumference of the recess in which the washer is placed to assist in holding the hold-fast bolts in the jambs; fifthly, to provide detachable plates under the heads of the hold-fast bolts; sixthly, to provide cleats made integral with the plates under the heads of the hold-fast bolts, to fit the different types of devices attached to safety belts whereby they are attached to the hold-fast bolts.

It is thought that the method used by me for the securing of hold-fast bolts to the jambs of window frames, would entitle me to a basic method patent as well as allowance of the claims herewith. To accomplish these objects, I bore a hole in the outside edge bead of the window jamb to a distance to match the length of the hold-fast bolt to be used, and then at right angles, approximately, to the diameter of this hole and at sufficient distance from the edge of the said bead to allow for a washer and a nut to be inserted on the bolt after it has been placed in position in the jamb, I bore a hole in the face of the jamb of sufficient diameter to admit the insertion of the washer and nut required to hold the hold-fast bolt in the jamb, and under the head of the hold-fast bolts I place a plate or washer shaped to match the edge of the window jamb and then insert the hold-fast bolt and place the washer in the recess in the face of the jamb and pass the bolt through the washer and then place the threaded nut on the end of the bolt and by turning the bolt secure it in place in the jamb.

My hold fast-bolt may be provided with an eye head or any other type of head; and the plate, used to support the bolt head and re-inforce the bead of the jamb around the bolt, may be provided with cleat heads by which the guard belts may be attached to the hold-fast fixture, instead of securing the guard belt direct to the hold-fast bolts.

Referring to the drawings.

Fig. 1 is a section of a window frame jamb, illustrating my hold-fast fixture with an eye head to the bolt and the supporting re-inforcing plate or washer in position through which the hold-fast bolt passes into the jamb.

Fig. 2 is a view of the same, illustrating a modified hold-fast bolt with a flat head and the hold fast-heads secured to the supporting and re-inforcing plate.

Fig. 3 is a front elevation of Fig. 1, illustrating the washer 8 with its curved face to match the inner surface of the circumference of the recess in the face of the jamb.

Fig. 4 is a sectional view of the washer 8 illustrating its curved face or a half-round structure of material from which the washer is made.

Fig. 5 is a front elevation of the modified supporting and re-inforcing plate with the heads of the cleats made integral with the plate.

Fig. 6 is a side view of the same.

Fig. 7 is a view of the re-inforcing plate looking from the top of the jamb.

Referring to the numerals on the drawings, 1 is a section of a window frame jamb in which the hole 2 is bored at right angles to the face of the jamb, through the outside edge bead 5 of which is bored a hole 3 in line with the diameter of the hole 2, and in this hole 3 is inserted the hold-fast bolt 7 after the re-inforcing supporting plate 4 has been secured over the bead 5 of the jamb 1 by the screws 6, and then the washer 8 is inserted in the hole 2 and the nut 9 is placed on the bolt of the hold-fast 7 which is then turned until the hold-fast bolt 7 is secured tightly in place in the jamb 1.

The re-inforcing supporting plate 4 is curved 5' to match the bead 5 of the jamb 1 and is provided with screw holes 6' to position it on the bead of the jamb. This curved 5' inner surface of the re-inforcing plate 4 fits tightly upon the bead of the jamb thereby re-inforcing it to prevent splitting of the jamb by the strain upon the hold-fast bolt which this plate 4 supports at the hole 4' where the hold-fast bolt 7 enters the jamb 1 which prevents the bolt from sagging at the hole in the jamb.

This re-inforcing plate 4 may be provided with cleats 7" to be substituted in place of the eye head of the bolt 7 and is provided with the supporting hole 4' through which the bolt of the hold-fast bolt 7 is inserted in the jamb 5. 8 is the face of the washer squared with the hole 8", and 8' is the semi-circular face of the said washer to mate with the curved surface of the circumference of the hole in which the said washer is inserted over the bolt 7.

I do not care to limit myself to any particular type of hold-fast bolt or type of head; nor to any particular shape of holes in the window jambs; nor to any particular design of re-inforcing supporting plate.

What I claim is,—

1. A hold-fast window guard fixture, comprising a hold-fast bolt provided with a supporting plate concaved to re-inforce the bead edge of a window frame jamb, and means for securing both the bolt and the plate to the jamb.

2. A hold-fast window guard fixture, comprising a hold-fast bolt and a re-inforcing supporting plate detachably secured to said bolt, and provided with means whereby they are secured to a window frame jamb.

3. In a hold-fast window guard fixture, a supporting and re-inforcing plate provided with a surface designed to match the edge of a window jamb and provided with a hole through which a hold-fast bolt may be inserted to be secured to a window jamb 4. In a hold-fast window guard fixture, a supporting and re-inforcing plate provided with concaved inner surface to match the bead edge of a window frame jamb, and provided with means for detachably securing it to a window jamb.

5. In a hold-fast window guard fixture, comprising a bolt and a nut for securing it to a window frame jamb; a concave re-inforcing and supporting plate, and means for securing a window guard.

WALTER A. HEARN.